US009210051B2

(12) United States Patent
 Kruglick

(10) Patent No.: US 9,210,051 B2
(45) Date of Patent: Dec. 8, 2015

(54) COMPOUND CERTIFICATIONS FOR ASSURANCE WITHOUT REVEALING INFRASTRUCTURE

(75) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 6 days.

(21) Appl. No.: 14/004,902

(22) PCT Filed: Sep. 12, 2012

(86) PCT No.: PCT/US2012/054942
§ 371 (c)(1),
(2), (4) Date: Sep. 12, 2013

(87) PCT Pub. No.: WO2014/042632
PCT Pub. Date: Mar. 20, 2014

(65) Prior Publication Data
US 2014/0325047 A1   Oct. 30, 2014

(51) Int. Cl.
*H04L 29/06* (2006.01)
*H04L 12/24* (2006.01)
*G06Q 10/10* (2012.01)
*G06Q 30/00* (2012.01)

(52) U.S. Cl.
CPC ............ *H04L 41/5041* (2013.01); *G06Q 10/10* (2013.01); *G06Q 30/018* (2013.01)

(58) Field of Classification Search
CPC  H04L 41/5041; H04L 63/0823; G06Q 10/10; G06Q 30/018
USPC .......................... 726/1, 10; 713/157, 180, 175
See application file for complete search history.

(56) References Cited

U.S. PATENT DOCUMENTS

| 5,367,573 | A  | * | 11/1994 | Quimby ........................ 713/167 |
| 5,610,982 | A  |   | 3/1997  | Micali |
| 6,256,734 | B1 | * | 7/2001  | Blaze et al. .................... 713/157 |
| 6,516,451 | B1 | * | 2/2003  | Patin ............................. 716/136 |
| 6,883,100 | B1 | * | 4/2005  | Elley et al. ........................ 726/5 |
| 7,716,720 | B1 | * | 5/2010  | Marek et al. ...................... 726/2 |
| 7,970,731 | B2 | * | 6/2011  | Potts et al. .................... 707/602 |
| 8,566,578 | B1 | * | 10/2013 | Banerjee ....................... 713/153 |
| 8,689,224 | B2 | * | 4/2014  | Hotra ............................ 718/104 |
| 8,799,334 | B1 | * | 8/2014  | Stefanov et al. .............. 707/821 |
| 8,931,106 | B2 | * | 1/2015  | Maher et al. .................... 726/26 |
| 2002/0004901 | A1 | * | 1/2002 | Yip et al. ...................... 713/156 |
| 2002/0016777 | A1 |   | 2/2002 | Seamons et al. |

(Continued)

OTHER PUBLICATIONS

International Search Report and Written Opinion for PCT/US12/54942, Filed Sep. 12, 2012, mailed Feb. 14, 2013.

(Continued)

*Primary Examiner* — David Garcia Cervetti
(74) *Attorney, Agent, or Firm* — Turk IP Law, LLC

(57) ABSTRACT

Technologies are presented for providing compound certificates via a certificate intermediary. In some examples, a certificate intermediary may generate a compound certificate that captures the certified behavior of an application and its underlying sub-services without revealing the identities of the sub-services for providing to a customer. The certificate intermediary may receive individual certificates from a certification authority. In other examples, the certification authority may generate the compound certificate, or the certificate intermediary may act as the certification authority for at least a portion of the sub-services.

21 Claims, 8 Drawing Sheets

(56) References Cited

U.S. PATENT DOCUMENTS

| | | | |
|---|---|---|---|
| 2002/0042687 A1* | 4/2002 | Tracy et al. | 702/119 |
| 2003/0004754 A1* | 1/2003 | Krutz | 705/2 |
| 2003/0041033 A1* | 2/2003 | Kaplan | 705/64 |
| 2003/0050718 A1* | 3/2003 | Tracy et al. | 700/91 |
| 2003/0182180 A1* | 9/2003 | Zarrow | 705/11 |
| 2004/0054988 A1* | 3/2004 | Atallah et al. | 717/122 |
| 2004/0078434 A1* | 4/2004 | Parker et al. | 709/206 |
| 2004/0111379 A1* | 6/2004 | Hicks et al. | 705/76 |
| 2004/0128546 A1* | 7/2004 | Blakley et al. | 713/201 |
| 2004/0150662 A1* | 8/2004 | Beigel | 345/707 |
| 2004/0153414 A1* | 8/2004 | Khaishgi et al. | 705/58 |
| 2004/0181591 A1* | 9/2004 | Yu et al. | 709/217 |
| 2004/0181665 A1* | 9/2004 | Houser | 713/158 |
| 2004/0181818 A1* | 9/2004 | Heyner et al. | 725/146 |
| 2005/0193101 A1* | 9/2005 | Oliver et al. | 709/220 |
| 2005/0235150 A1* | 10/2005 | Kaler et al. | 713/168 |
| 2005/0246534 A1* | 11/2005 | Kirkup et al. | 713/170 |
| 2005/0246760 A1* | 11/2005 | Kaler et al. | 726/1 |
| 2005/0251857 A1* | 11/2005 | Schunter et al. | 726/16 |
| 2005/0262086 A1* | 11/2005 | Ta et al. | 707/9 |
| 2006/0059549 A1* | 3/2006 | Suzuki et al. | 726/9 |
| 2006/0093149 A1* | 5/2006 | Zhu et al. | 380/277 |
| 2007/0005390 A1* | 1/2007 | Morgan | 705/1 |
| 2007/0012789 A1* | 1/2007 | Hartney et al. | 235/492 |
| 2007/0101093 A1* | 5/2007 | Lawrence | 711/170 |
| 2007/0169049 A1* | 7/2007 | Gingell et al. | 717/151 |
| 2007/0179911 A1* | 8/2007 | Key | 705/403 |
| 2007/0226487 A1* | 9/2007 | Li | 713/156 |
| 2008/0082354 A1* | 4/2008 | Hurry et al. | 705/1 |
| 2008/0092107 A1* | 4/2008 | McWilliam et al. | 717/101 |
| 2008/0147455 A1* | 6/2008 | Brunswig et al. | 705/7 |
| 2009/0083734 A1* | 3/2009 | Hotra | 718/1 |
| 2009/0089625 A1* | 4/2009 | Kannappan et al. | 714/39 |
| 2009/0144837 A1* | 6/2009 | Huff et al. | 726/30 |
| 2009/0288084 A1* | 11/2009 | Astete et al. | 718/1 |
| 2010/0011224 A1* | 1/2010 | Vion-Dury | 713/189 |
| 2010/0057493 A1* | 3/2010 | Heckelman | 705/2 |
| 2010/0293049 A1* | 11/2010 | Maher et al. | 705/14.46 |
| 2010/0293050 A1* | 11/2010 | Maher et al. | 705/14.46 |
| 2010/0293058 A1* | 11/2010 | Maher et al. | 705/14.66 |
| 2011/0125894 A1 | 5/2011 | Anderson et al. | |
| 2011/0178831 A1 | 7/2011 | Ravichandran | |
| 2011/0276490 A1* | 11/2011 | Wang et al. | 705/50 |
| 2011/0321131 A1 | 12/2011 | Austel et al. | |
| 2012/0151568 A1* | 6/2012 | Pieczul et al. | 726/8 |
| 2012/0209890 A1* | 8/2012 | Nowacki et al. | 707/805 |
| 2012/0216244 A1* | 8/2012 | Kumar et al. | 726/1 |
| 2012/0284382 A1* | 11/2012 | Aboualy et al. | 709/223 |
| 2013/0132933 A1* | 5/2013 | Rajaram et al. | 717/126 |
| 2013/0145419 A1* | 6/2013 | Hu | 726/1 |
| 2013/0167250 A1* | 6/2013 | Balasubramanian | 726/28 |
| 2013/0332194 A1* | 12/2013 | D'Auria et al. | 705/3 |
| 2013/0332376 A1* | 12/2013 | Pilon et al. | 705/317 |
| 2014/0047532 A1* | 2/2014 | Sowatskey | 726/10 |

OTHER PUBLICATIONS

Bezzi et al., "An Architecture for Certification-aware Service Discovery", In Securing Services on the Cloud (IWSSC), 1st International Workshop, pp. 14-21, Sep. 2011.

ASSERT4SOA Advanced Security Service cERTificate for SOA; http://www.assert4soa.eu/public-deliverables, retrieved on Sep. 11, 2013.

Pazzaglia et al., "Advanced security service certificate for soa: Certified services go digital!", Securing Electronic Business Processes, Information Security Solution Europe (ISSE), Oct. 2010.

Mahbub et al., "Assert4SOa—Advanced Security Service cERTificate for SOA", Asserts Aware Service Query Language and Discovery Engine, Sep. 2011.

Anisetti et al., "Assert4SOa—Advanced Security Service cERTificate for SOA", Design and Description of Evidence-Based Certificates Artifacts for Service, Sep. 2011.

* cited by examiner

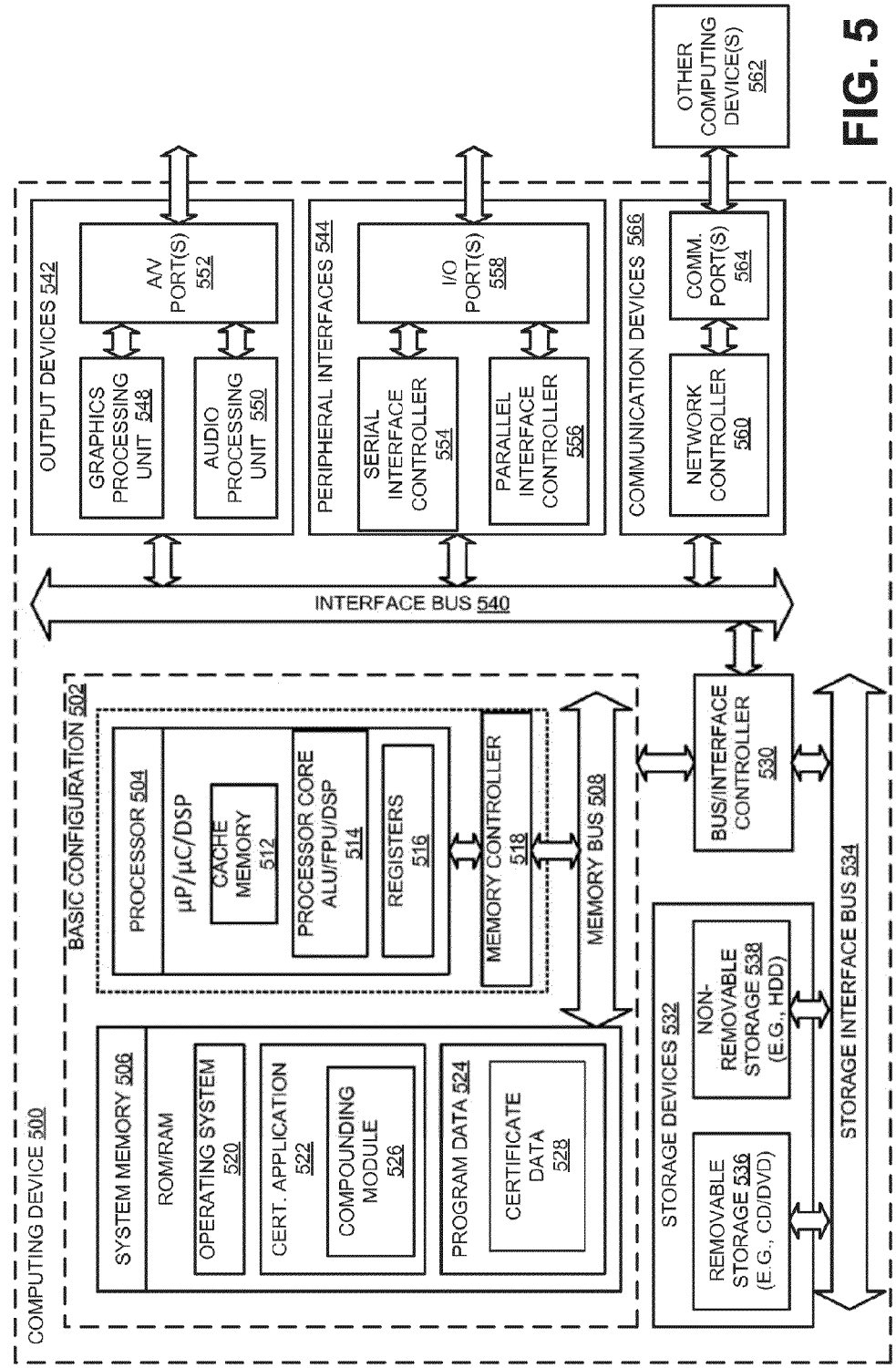

# COMPOUND CERTIFICATIONS FOR ASSURANCE WITHOUT REVEALING INFRASTRUCTURE

CROSS-REFERENCE TO RELATED APPLICATION

This application is the National Stage filing under 35 U.S.C §371 of PCT application Ser. No. PCT/US12/54942 filed on Sep. 12, 2012. The PCT Application is herein incorporated by reference in its entirety.

BACKGROUND

Unless otherwise indicated herein, the materials described in this section are not prior art to the claims in this application and are not admitted to be prior art by inclusion in this section.

As cloud-based computing becomes more prevalent, cloud services may become cheaper and more available. In some cases, cloud-based service applications may be built upon other cloud services or platforms. Such service-based cloud architectures may provide a flexible tool for quickly building powerful datacenter applications. Together with certification of cloud services, service-based architectures may allow automated discovery and building of business process services that accomplish complex goals while maintaining desired standards. Cloud service certification may use certificates to establish compliance of individual service elements with various rules, standards, and practices. These certificates may typically be confirmed by exposing the certifications of the lower-level sub-services that support the top-level application to the application customer. For example, if a particular storage service underlies the application, the specific certificate for that particular storage service may be revealed to the customer. This means that anyone who uses a service may know all the sub-services used to build a top level service.

SUMMARY

The present disclosure generally describes technologies for employing compound certifications for assurance without revealing infrastructure in a datacenter based service environment.

According to some example embodiments, a method for employing compound certification for assurance may include receiving, at an intermediary certification service, a redirected request for certification from a service application, requesting certificates associated with the service application and service elements of the service application from a certification authority, receiving the certificates, composing a compound certificate based on the received certificates, where the compound certificate suppresses identities of the service elements, and providing the compound certificate in response to the redirected request.

According to other example embodiments, a method for employing compound certification for assurance may include receiving a request for service from an application hosted by a datacenter, where the request includes a request for certification, separating the request for certification from the request for service, requesting certificates associated with the application and service elements of the application from a certification authority, receiving the certificates, composing a compound certificate based on the received certificates, where the compound certificate suppresses identities of the service elements, and providing the compound certificate in response to the request for service.

According to further example embodiments, an intermediate certification service configured to employ compound certification for assurance may include communication module(s) configured to communicate with service applications hosted by datacenters and certification authorities and a server. The server may be configured to receive a redirected request for certification from a service application, request certificates associated with the service application and service elements of the service application from a certification authority, receive the certificates, compose a compound certificate based on the received certificates, where the compound certificate suppresses identities of the service elements, and provide the compound certificate in response to the redirected request.

According to yet further example embodiments, a cloud-based datacenter configured to employ compound certification for assurance may include multiple virtual machines operable to be executed on one or more physical machines, where at least one of the virtual machines hosts a service application configured to provide a combination service to customers. The datacenter may also include a datacenter controller configured receive a request for service from the service application hosted by the datacenter, where the request includes a request for certification, separate the request for certification from the request for service, and forward the request for certificate to an intermediary certification service such that a compound certificate composed of individual certificates for sub-services that suppresses identities of service elements is provided by the intermediary certification service in response to the request for service.

According to some example embodiments, a computer-readable storage medium may store instructions for employing compound certification for assurance. The instructions may include receiving a redirected request for certification at an intermediary certification service from a service application, requesting certificates associated with the service application and service elements of the service application from a certification authority, receiving the certificates, composing a compound certificate based on the received certificates, where the compound certificate suppresses identities of the service elements, and providing the compound certificate in response to the redirected request.

According to other example embodiments, a computer-readable storage medium may store instructions for employing compound certification for assurance. The instructions may include receiving a request for service from an application hosted by a datacenter, where the request includes a request for certification, separating the request for certification from the request for service, requesting certificates associated with the application and service elements of the application from a certification authority, receiving the certificates, composing a compound certificate based on the received certificates, where the compound certificate suppresses identities of the service elements, and providing the compound certificate in response to the request for service.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates a general purpose computing device, which may be used to manage compound certification for assurance without revealing infrastructure;

DETAILED DESCRIPTION

Figure 1:
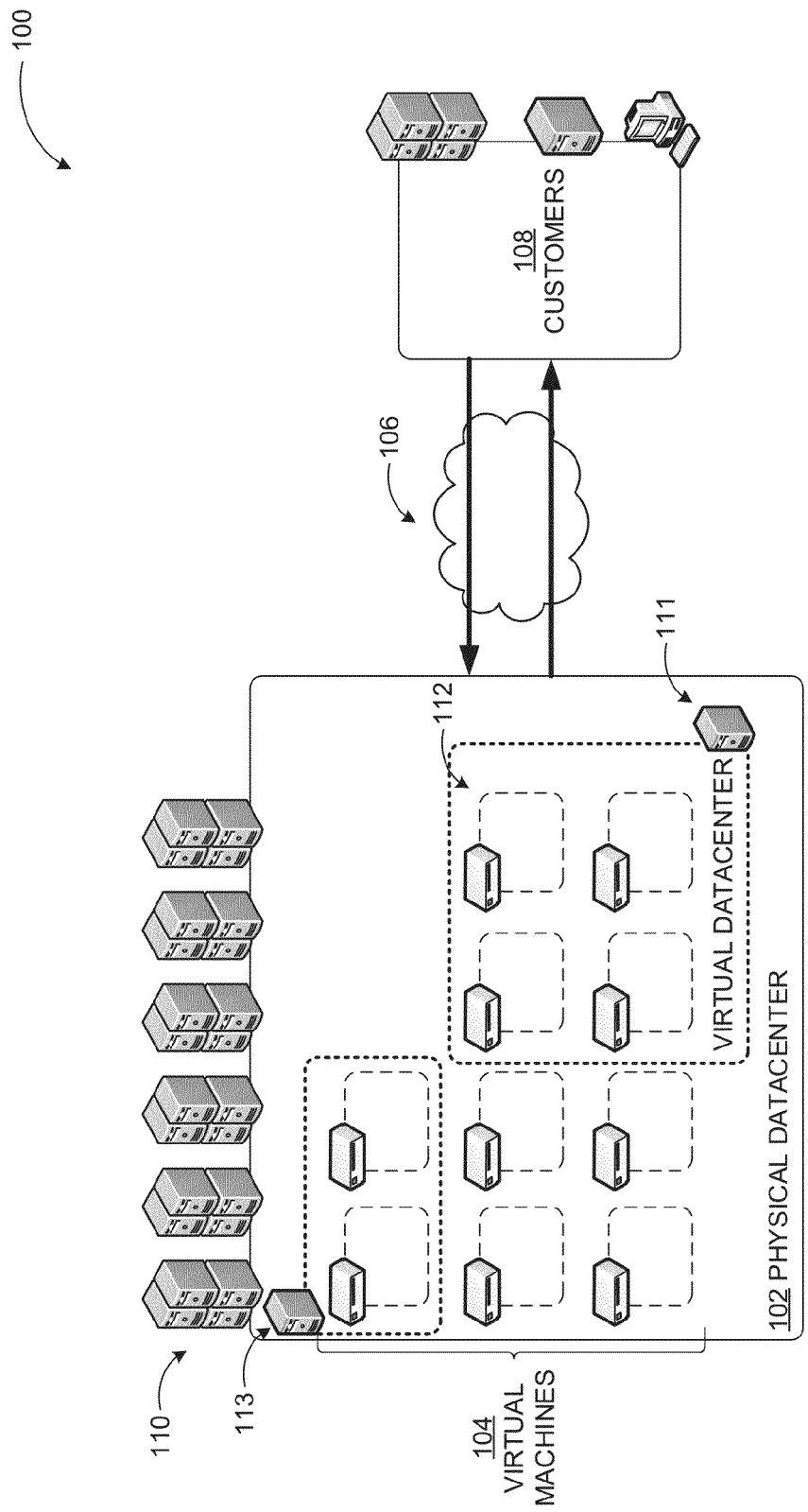
FIG. 1 illustrates an example datacenter based system where compound certification may be used for assurance without revealing infrastructure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to employing compound certification for assurance without revealing infrastructure.

Briefly stated, technologies are presented for providing compound certificates via a certificate intermediary. In some examples, a certificate intermediary may generate a compound certificate that captures the certified behavior of an application and its underlying sub-services without revealing the identities of the sub-services for providing to a customer. The certificate intermediary may receive individual certificates from a certification authority. In other examples, the certification authority may generate the compound certificate, or the certificate intermediary may act as the certification authority for at least a portion of the sub-services.

FIG. 1 illustrates an example datacenter based system where compound certification may be used for assurance without revealing infrastructure, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

In some examples, one or more of the customers 108 may provide a combination service to their clients via the datacenter combining various sub-services such as storage, computation, etc. The clients of the customers 108 may request certification for the services from the customers 108. Such certification may be provided by a third party certification authority. A certification authority is an entity that issues digital certificates. The digital certificate may certify the ownership of a public key by the named subject of the certificate. This allows others (relying parties) to rely upon signatures or assertions made by the private key that corresponds to the public key that is certified. In this model of trust relationships. Thus, a certification authority is a trusted third party that is trusted by both the subject (owner) of the certificate and the party relying upon the certificate. The certification authorities are characteristic of many public key infrastructure (PKI) schemes. VeriSign, Comodo, and DigiNotar are some example commercial root certification authorities. A large number of other companies provide certificates for their own software, for example. In some cases, the datacenter operator may be a certification authority if the clients trust them, and that the customer 108 may even be a "self-signing" certification authority if it is trusted. For example, if a company X provides services to employees or subsidiaries, that company may also act as the certification authority. In a conventional environment, the third party certification authority may certify the combination service as well as the individual sub-services, thus identifying the sub-services to a requesting client. In a system according to embodiments, a compound certificate may be generated for the combined service certifying the individual sub-services but not identifying them to the clients.

Figure 2:
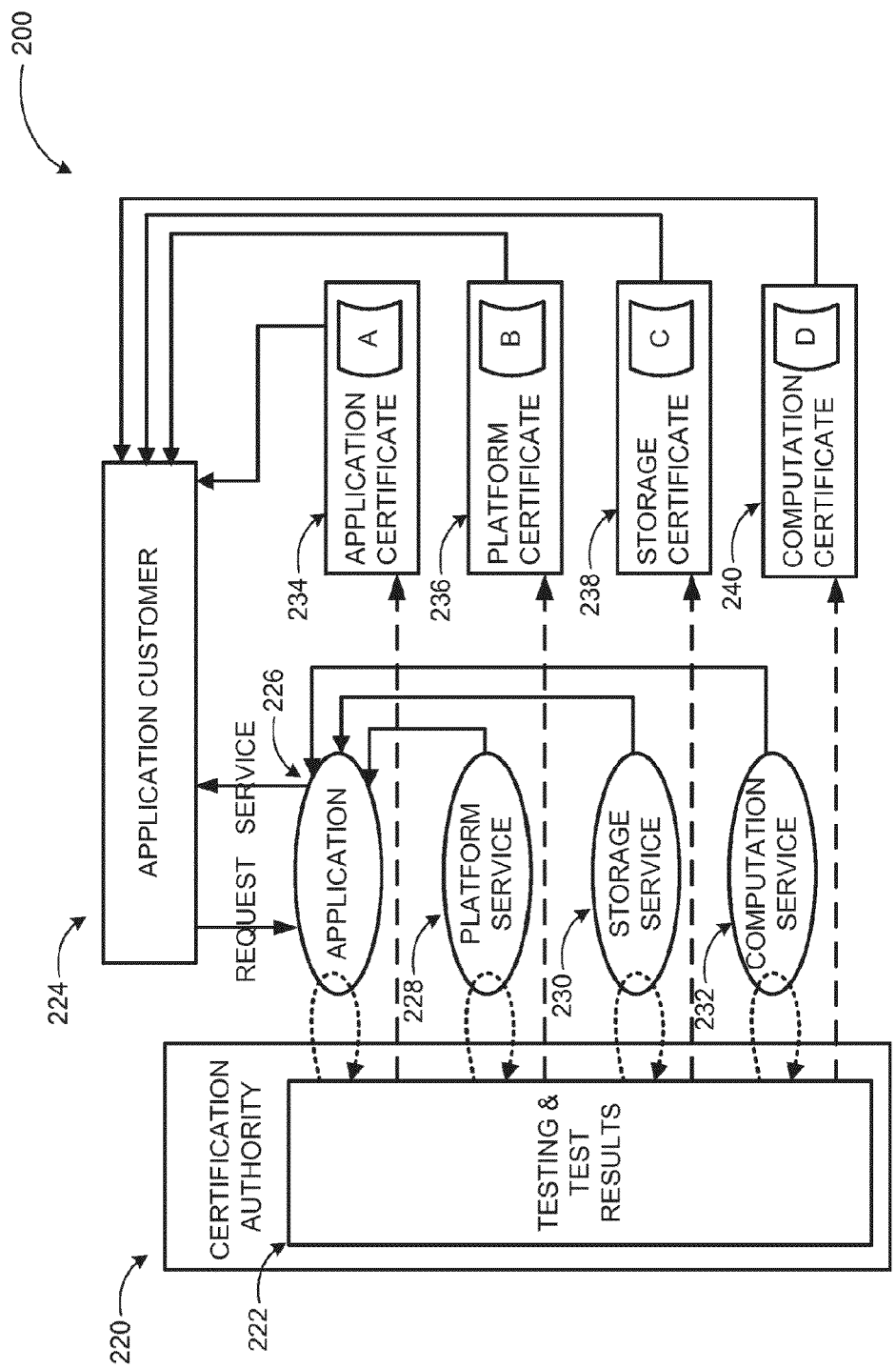
FIG. 2 illustrates an example system, where an application providing a combination service and its sub-services each provide separate certificates to a customer of the application.

FIG. 2 illustrates an example system where an application providing a combination service and its sub-services each provide separate certificates to a customer of the application, arranged in accordance with at least some embodiments described herein.

As shown in a diagram 200, an application customer 224 may request and receive services from an application 226. The application 226 may operate on a platform service 228 (i.e., a cloud-based service that provides, among other things, a hardware architecture and/or a software framework for an application to run). The application 226 may also be supported by a storage service 230 (i.e., a service that provides data storage, often cloud-based), a computation service 232 (i.e., a service that provides processing/computational power, often cloud-based), and/or any other service. A certification authority 220 may be configured to perform testing on the application 226, the platform service 228, the storage service 230, and/or the computation service 232 and obtain test results 222. The testing on the application 226 or the sub-services may include testing a capacity of the application to handle various amounts of data, responsiveness under stress conditions (e.g., large number of client requests), speed of response, etc. The test results 222 may be related to whether the applications/services comply with particular rules, standards, and/or practices.

Based on the test results 222, business process documentation, audits, or other evaluations, the certification authority 220 may issue certificates to the application and/or its sub-services, where each certificate may certify that the associated entity possesses certain properties or meets certain criteria. The criteria may be based on industry standards or client requirements. For example, storage capacity, data delivery speed, processing capacity, security levels, etc. may be defined as client requested criteria. Application and/or sub-service features such as data processing capacity, security, etc. may be viewed as properties that are certified against the criteria. In an example scenario, the certification authority 220 may issue an application certificate 234 certifying that the application 226 possesses property "A". The certification authority 220 may also issue a platform certificate 236 certifying that the platform service 228 possesses property "B". The certification authority 220 may further issue a storage certificate 238 certifying that the storage service 230 possesses property "C". And, the certification authority 220 may issue a computation certificate 240 certifying that the computation service 232 possesses property "D". In some embodiments, more than one certification authority may be involved. For example, the application certificate 234 may be issued by one certification authority, while the platform certificate 236 may be issued by a different certification authority. In some embodiments, multiple certification authorities may issue certificates for a single application or service.

When the application customer 224 receives certified services from the application 226, the application customer 224 may also request and receive all the certificates 234, 236, 238, and 240 in order to confirm certification of the received services with the certification authority 220.

Providing each of the certificates 234, 236, 238, and 240 to the application customer 224 may mean that the application customer 224 may receive identifying information on the specific services that underlie/support the application 226. For example, the platform certificate 236 may identify the platform service 228, the storage certificate 238 may identify the storage service 230, and the computation certificate 240 may identify the computation service 232. However, in some embodiments, the provider of the application 226 may not want to publicize the specific services that support the application 226. For example, providers of applications that take advantage of creative combinations of other services (sometimes known as "mash-ups") may not want to reveal the identities of the specific services being combined. A customer or competitor may be able to easily duplicate the identified applications or use them without the application 226 acting as intermediary.

One potential solution may be to allow the application 226 to construct an intersection certificate from the certificates 234, 236, 238, and 240 by, for example, using a logical combination of the certified properties. For example, the application 226 may construct an intersection certificate certifying that the service provided by the application 226 has properties "A", "B", "C", and "D", by using a logical combination of the properties from the certificates 234, 236, 238, and 240, respectively. However, this approach may not be secure, because the application 226 may be able to falsify certificate information/properties and/or present certificates from services it no longer uses or it uses some of the time. For example, the application 226 may use the certified storage service 238 a small percentage of the time, while mostly relying on uncertified (and presumably cheaper) storage services. The application 226 may then be able to manipulate customers by providing a single, anonymized certificate that includes information from the certificate 238 (for the storage service 230), even though the certified storage service 230 is only rarely used. On the other hand, self-certification, as discussed above, is employed in some situations. For example, application 226 may develop the compound certification, especially if they allow some level of offline auditing or financial guarantee based on contract terms.

Figure 3:
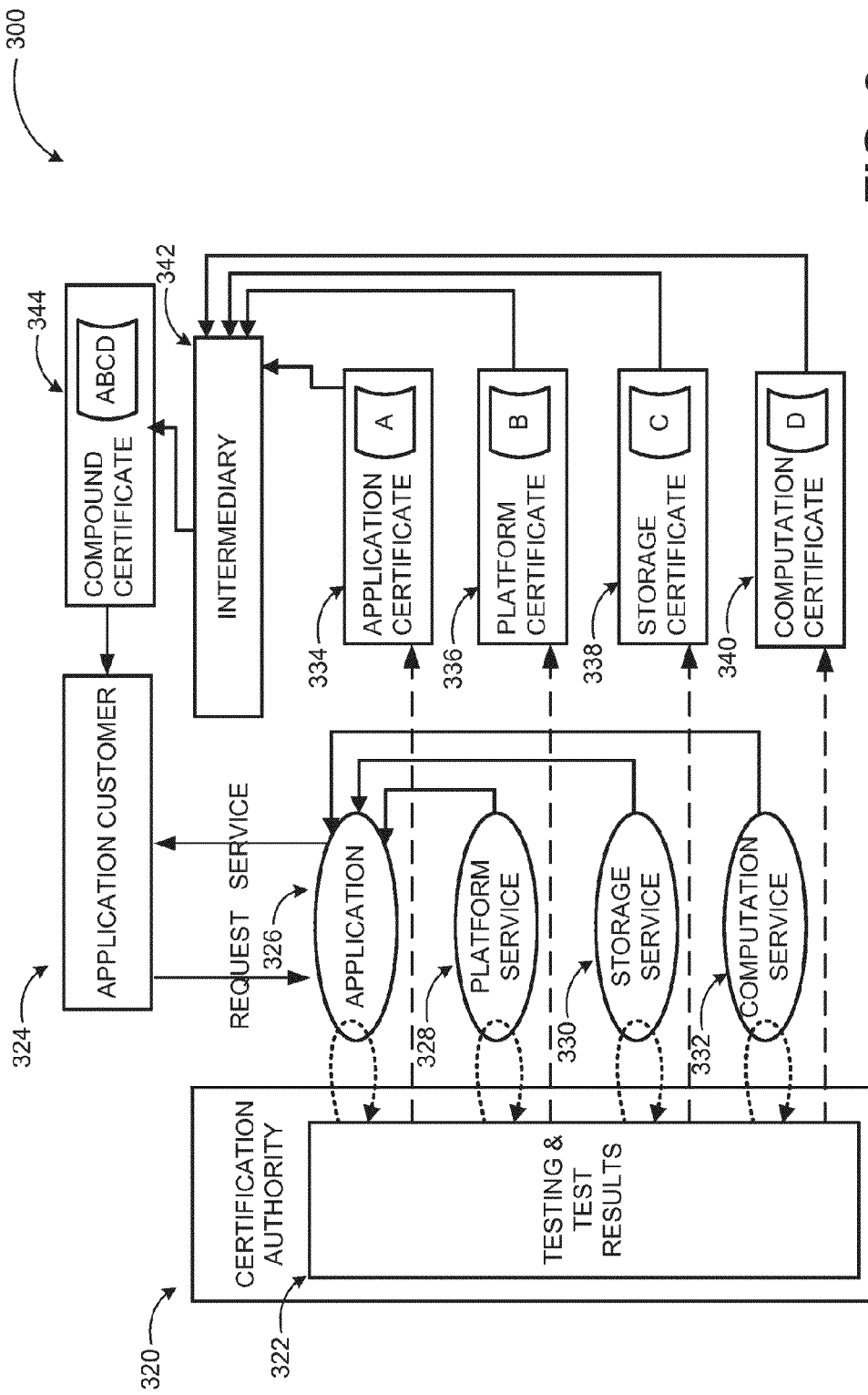
FIG. 3 illustrates an example system, where an application providing a combination service may be enabled to avoid exposing its sub-services by using a compound certificate.

FIG. 3 illustrates an example system where an application providing a combination service may be enabled to avoid exposing its sub-services by using a compound certificate, arranged in accordance with at least some embodiments described herein.

As shown in a diagram 300, an application customer 324 (similar to the application customer 224 in FIG. 2) may request and receive services from an application 326 (similar to the application 226 in FIG. 2). Similar to the situation depicted in FIG. 2, the application 326 may operate on a platform service 328, and also may be supported by a storage service 330 and/or a computation service 332. A certification authority 320 (similar to the certification authority 220 in FIG. 2) may perform testing 322 on the application 326, the platform service 328, the storage service 330, and/or the computation service 332. The certification authority 320 may then issue certificates 334, 336, 338, and/or 340 certifying certain properties associated with the application 326, the platform service 328, the storage service 330, and/or the computation service 332, respectively.

However, if the customer is requesting certified services (and therefore also requesting certificates), instead of providing the certificates 334, 336, 338, and/or 340 directly to the application customer 324 (as is the case in FIG. 2), the certificates may be provided to an intermediary 342. In some embodiments, the intermediary 342 may be associated with or provided by a certification authority (e.g., the certification authority 320), a datacenter, or some other respected and trusted entity or delegate. In some embodiments, the intermediary 342 may itself perform compliance testing and/or certification on the application 226, the platform service 228, the storage service 230, and/or the computation service 232, instead of or in addition to the certification authority 320.

The intermediary 342 may then generate a compound certificate 344 based on the certificates 334, 336, 338, and/or 340, for example by including a logical combination of the properties in the individual certificates (e.g., properties "A", "B", "C", and "D"). The application 326 may then direct any certification requests from the application customer 324 to the intermediary 342, which may then provide the compound certificate 344 to the application customer 324. In some embodiments, the intermediary 342 provides the compound certificate 344 to the application customer 324 when the customer 324 receives the requested service from the application 326. In other embodiments, the compound certificate 344 may be provided to the application customer 324 before the requested service is provided. The compound certificate 344 may also be provided after the requested service. Certifications may further be session or batch level and be associated with any timing.

The individual certificates (and/or the compound certificate 344) may optionally include other information. For example, the individual certificates may include information about whether the application 326, the platform service 328, the storage service 330, and/or the computation service 332 comply with payment card industry (PCI) standards, government restrictions on technology disclosures (e.g., International Traffic in Arms Regulations, or ITAR), healthcare industry standards (e.g., the Health Insurance Portability and Accountability Act, or HIPAA), controlled commerce list (CCL), ISO certifications, or any other suitable standard. In some examples, a compound certificate may not be able to claim compliance with a particular standard if not all of the included certificates/properties comply with the particular standard. In these situations, the compound certificate may reflect the lowest compliance level common across the included certificates/properties.

Figure 4A:
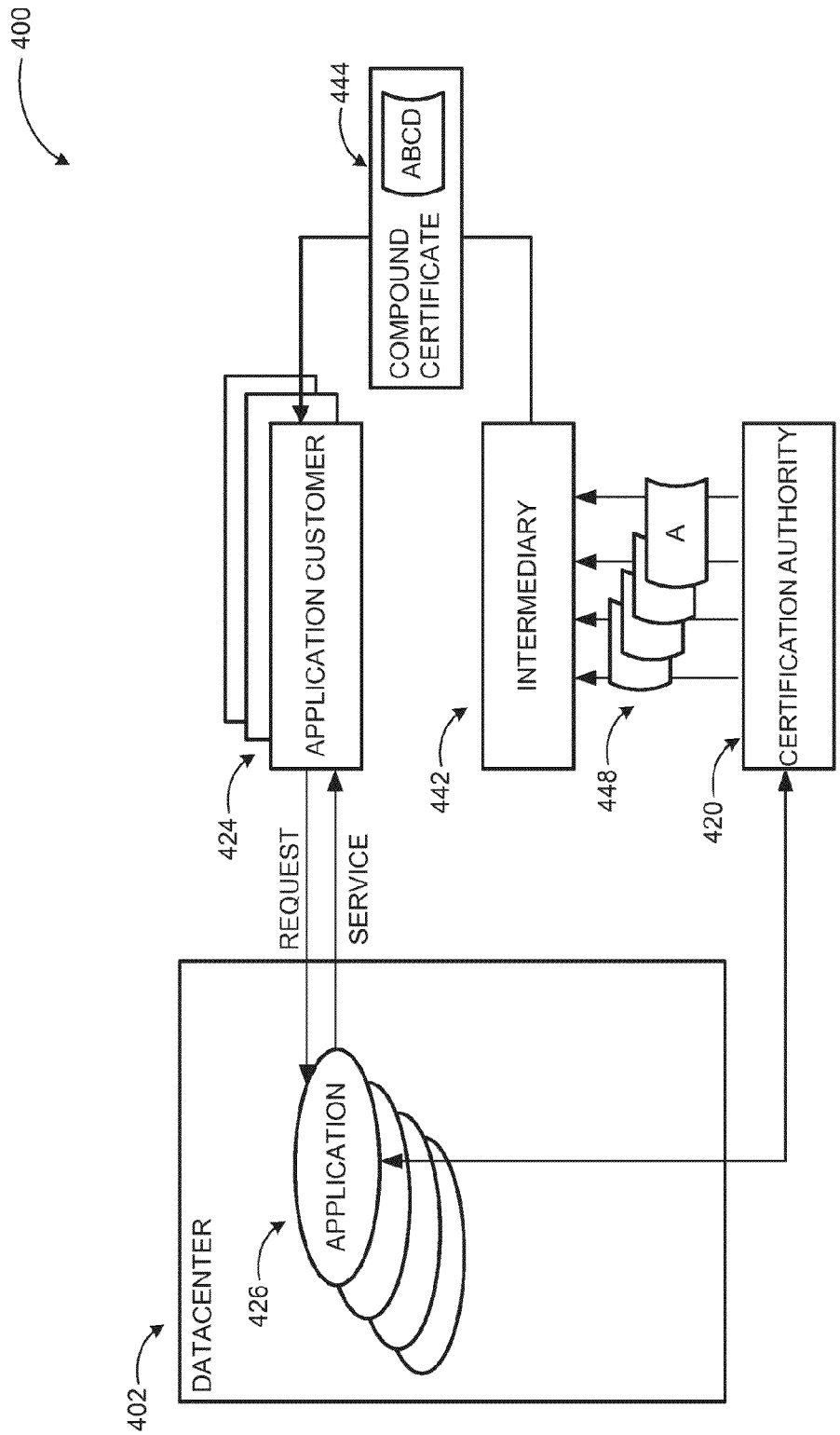
FIG. 4A illustrates an example system, where an independent intermediary service manages the compound certificate.

FIG. 4A illustrates an example system, where an independent intermediary service manages the compound certificate, arranged in accordance with at least some embodiments described herein.

As shown in a diagram 400, one or more application customers 424 (e.g., the customers 224/324 in FIGS. 2/3) may request services from one or more applications 426 (e.g., the applications 226/326 in FIGS. 2/3). The application 426 may be hosted at a datacenter 402, similar to the datacenter 102 described in FIG. 1. A certification authority 420 (similar to the certification authorities 220/320 in FIGS. 2/3) may provide sub-service certificates 448 associated with the application(s) 426 to an intermediary 442 (similar to the intermediary 342 in FIG. 2). For example, the sub-service certificates 448 may be the platform certificate 236/336, the storage certificate 238/338, and/or the computation certificate 240/340 described in FIGS. 2/3. The intermediary 442 may then combine the sub-service certificates 448 into a compound certificate 444 (similar to compound certificate 342 in FIG. 3). When the application 426 provides the requested service to the application customers 424, the intermediary 442 may also provide the compound certificate 444 to the application customers 424. In some embodiments, the application 426 may direct the intermediary 442 to provide the compound certificate 444 as it is providing the requested service.

Figure 4B:
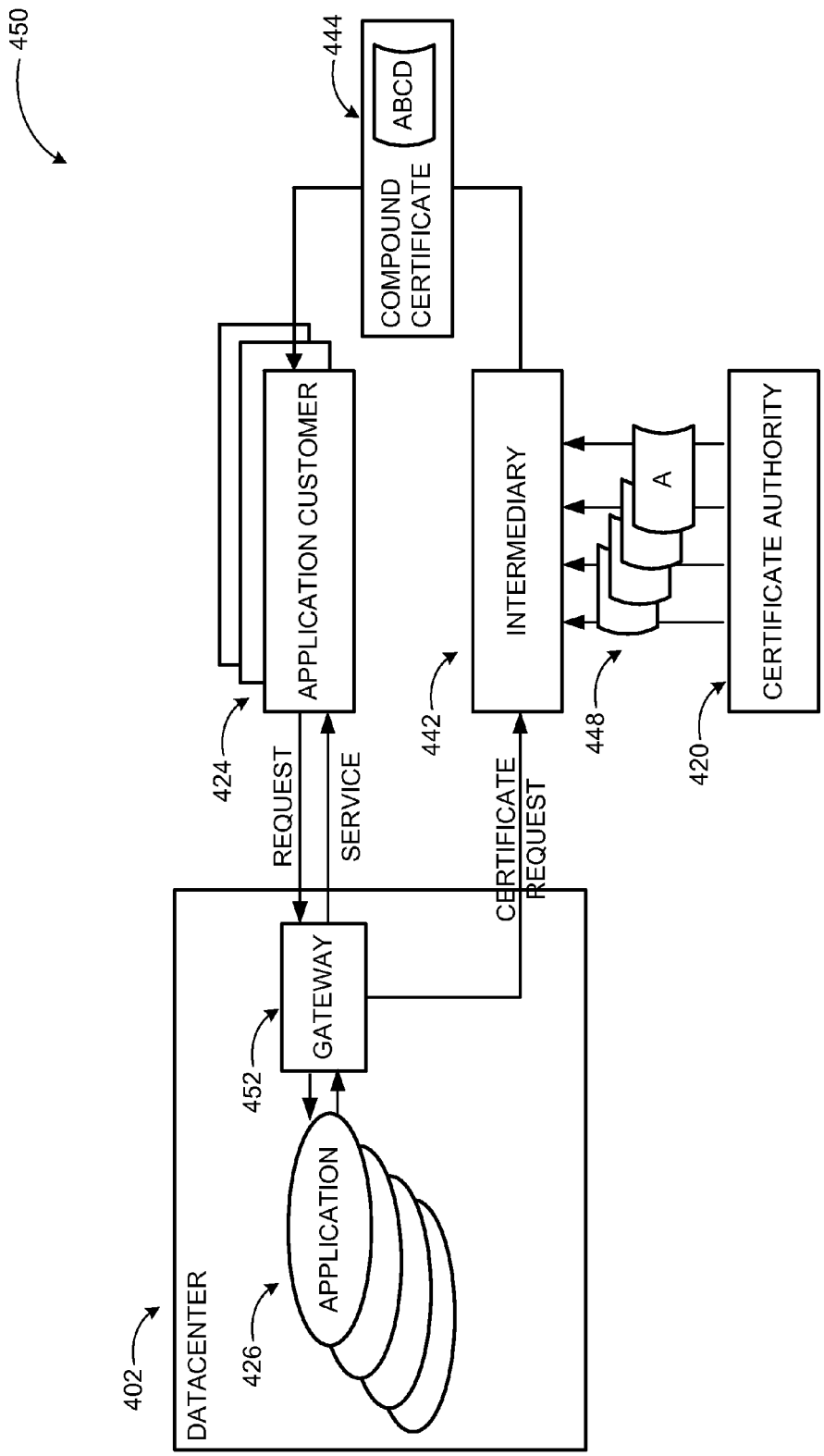
FIG. 4B illustrates an example system, where a datacenter hosting the application manages the compound certificate.

FIG. 4B illustrates an example system, where a datacenter hosting the application manages the compound certificate, arranged in accordance with at least some embodiments described herein.

Similarly-numbered elements in a diagram 450 of FIG. 4B behave in a likewise manner as in the diagram 400 in FIG. 4A. However, in the diagram 450, a gateway (or session border controller, network processor, or similar) 452 at the datacenter 402 may provide redirection or copying of the service/certification request to the intermediary 442, which itself may be an entity such as a VM instance. The interception of traffic may provide ease of implementation without a need for reprogramming the application to handle the certification (through the intermediary) process. The gateway 452 may provide an interface to the application 426 and be either part of the application 426 or a separate part of the datacenter as discussed above.

Specifically, certified service requests to the application 426 from the application customer 424 may be intercepted by the gateway 452. The gateway 452 may separate the service request from the certification request, and then may pass the service request on to the application 426. The gateway 452 may forward the certificate request to the intermediary 442, which may construct a compound certificate 444 as described above and provide to the application customer 424. The application 426 may provide the requested service to the application customer 424 through the gateway 452. A datacenter configured thus may be able to offer "compound certificates as a service" without having to modify the application 426. Therefore, the provider of the application 426 may be able to conceal the sub-services underlying the application 426 by simply opting into the datacenter-aided compound certificate service.

In some embodiments, the provision of certified services may be tailored for specific customers. For example, an application (e.g., the applications 226, 326, and 426 in FIGS. 2, 3, and 4A/B) may be configured to deliver differently priced certified and noncertified services to different customers. In some examples, an application may deliver certified services to a customer by using a certificate intermediary (e.g., the intermediary 342 and 442 in FIGS. 3 and 4A, or the gateway 452 in FIG. 4B), while delivering uncertified services to a different customer without using the certificate intermediary and without generating certificates sent to the customer. This discrimination between services (i.e., whether to provide certified or uncertified service) may be determined based on service request or traffic origin, conversation level, the particular session (e.g., based on login information), or any other suitable parameter.

In other examples, the individual sub-services that underlie the application may each provide tokens to the application. In turn, the application may then deliver the tokens to the certification authority to have the certification authority deliver a compound certificate to the application customer, independently or as a replacement for an application certificate (e.g., the application certificate 234 in FIG. 2).

FIG. 5 illustrates a general purpose computing device which may be used to manage compound certification for assurance without revealing infrastructure, arranged in accordance with at least some embodiments described herein.

For example, the computing device 500 may be used to manage compound certification for assurance without revealing infrastructure as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a certification application 522, and program data 524. The certification application 522 may include a compounding module 526 to manage compound certification for assurance without revealing infrastructure as described herein. The program data 524 may include, among other data, certificate data 528 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for managing compound certification for assurance without revealing infrastructure. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 6:
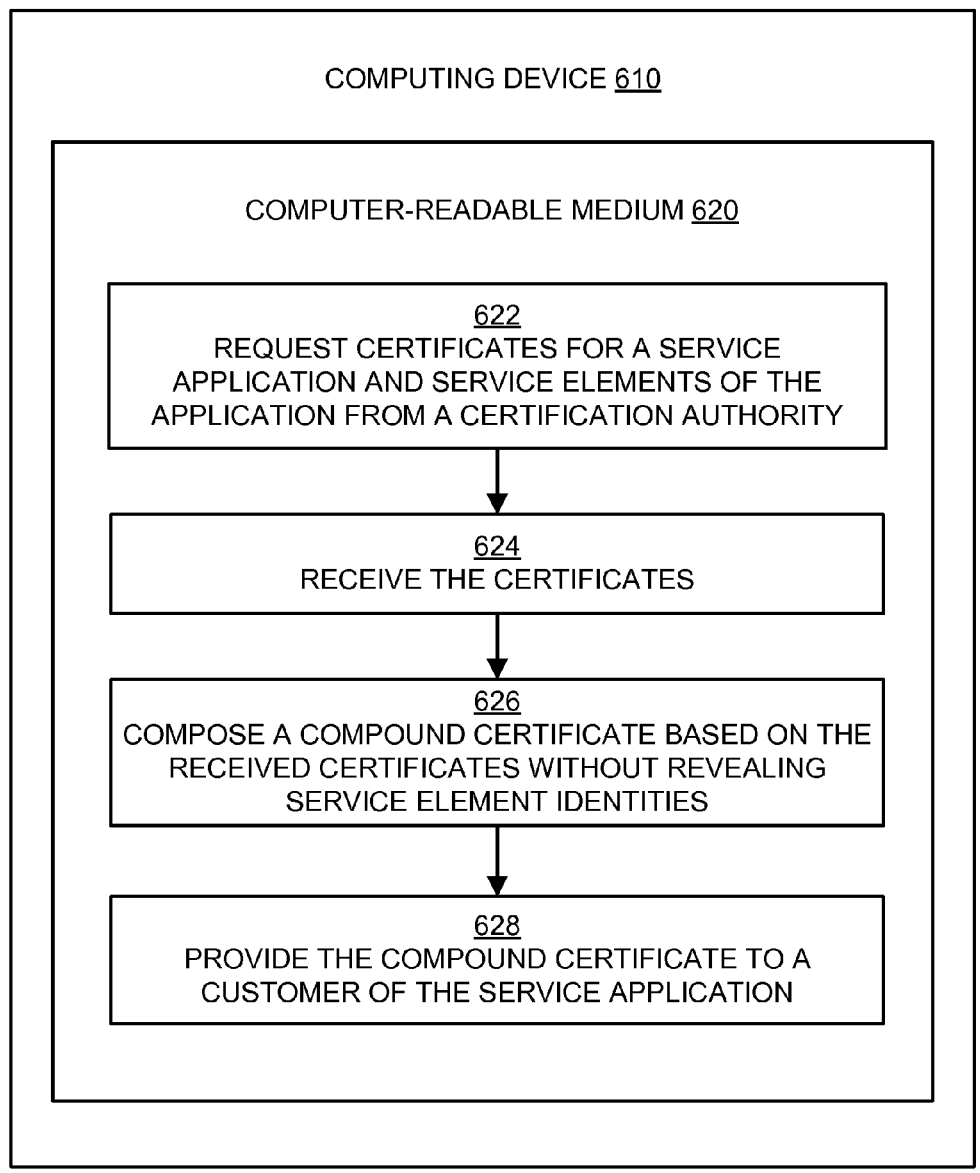
FIG. 6 is a flow diagram illustrating an example method that may be performed by a computing device such as the device in FIG. 5.

FIG. 6 is a flow diagram illustrating an example method that may be performed by a computing device such as the device 500 in FIG. 5, arranged in accordance with at least some embodiments described herein.

Example methods may include one or more operations, functions or actions as illustrated by one or more of blocks 622, 624, 626, and/or 628, and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for implementing compound certificates may begin with block 622, "REQUEST CERTIFICATES FOR A SERVICE APPLICATION AND SERVICE ELEMENTS OF THE APPLICATION FROM A CERTIFICATION AUTHORITY", where certificates (e.g., the application certificate 234/334, the platform certificate 236/336, the storage certificate 238/338, the computation certificate 240/340, and/or the certificates 448 in FIGS. 2, 3, and 4A/B) for an application (e.g., the application 226, 326, and/or 426 in FIGS. 2, 3, and 4A/B) and sub-service elements that underlie the application (e.g., the platform service 228/328, the storage service 230/330, and/or the computation service 232/332 in FIGS. 2 and 3) are requested from a certification authority (e.g., the certification authorities 220, 320, and/or 420 in FIGS. 2, 3, and 4A/B). In some examples, an intermediary (e.g., the intermediaries 342 and 442 in FIGS. 3 and 4A, or the gateway 452 in FIG. 4B) may request the certificates, and the intermediary may request the certificates in response to a certification request from the application and/or from an application customer (e.g., the customers 224, 324, and 424 in FIGS. 2, 3, and 4A/B). In other examples, a certification authority may request the certificates, especially in token-based situations as described above.

Block 622 may be followed by block 624, "RECEIVE THE CERTIFICATES", where the certificate requester receives the requested certificates.

Block 624 may be followed by block 626, "COMPOSE A COMPOUND CERTIFICATE BASED ON THE RECEIVED CERTIFICATES WITHOUT REVEALING SERVICE ELEMENT IDENTITIES", where the received certificates may be used to form a compound certificate without revealing the identities of the individual sub-services or service elements that underlie the application. For example, certified properties associated with each of the individual service element certificates may be logically combined and included in the compound certificate, as described above. In some examples, the overall compliance level of the compound certificate with regards to one or more rules, standards, or practices may be determined by the minimum common compliance level across certificates that are relevant to a specific property, as described above. In other examples, a certification authority, an intermediary or a datacenter gateway may compose the compound certificate.

Finally, block 626 may be followed by block 628, "PROVIDE THE COMPOUND CERTIFICATE TO A CUSTOMER OF THE SERVICE APPLICATION", where the compound certificate formed in block 626 may be provided to a customer who has requested service from the service application. In some examples, the certification authority, intermediary, or datacenter gateway that composed the compound certificate may provide the compound certificate to the customer.

Figure 7:
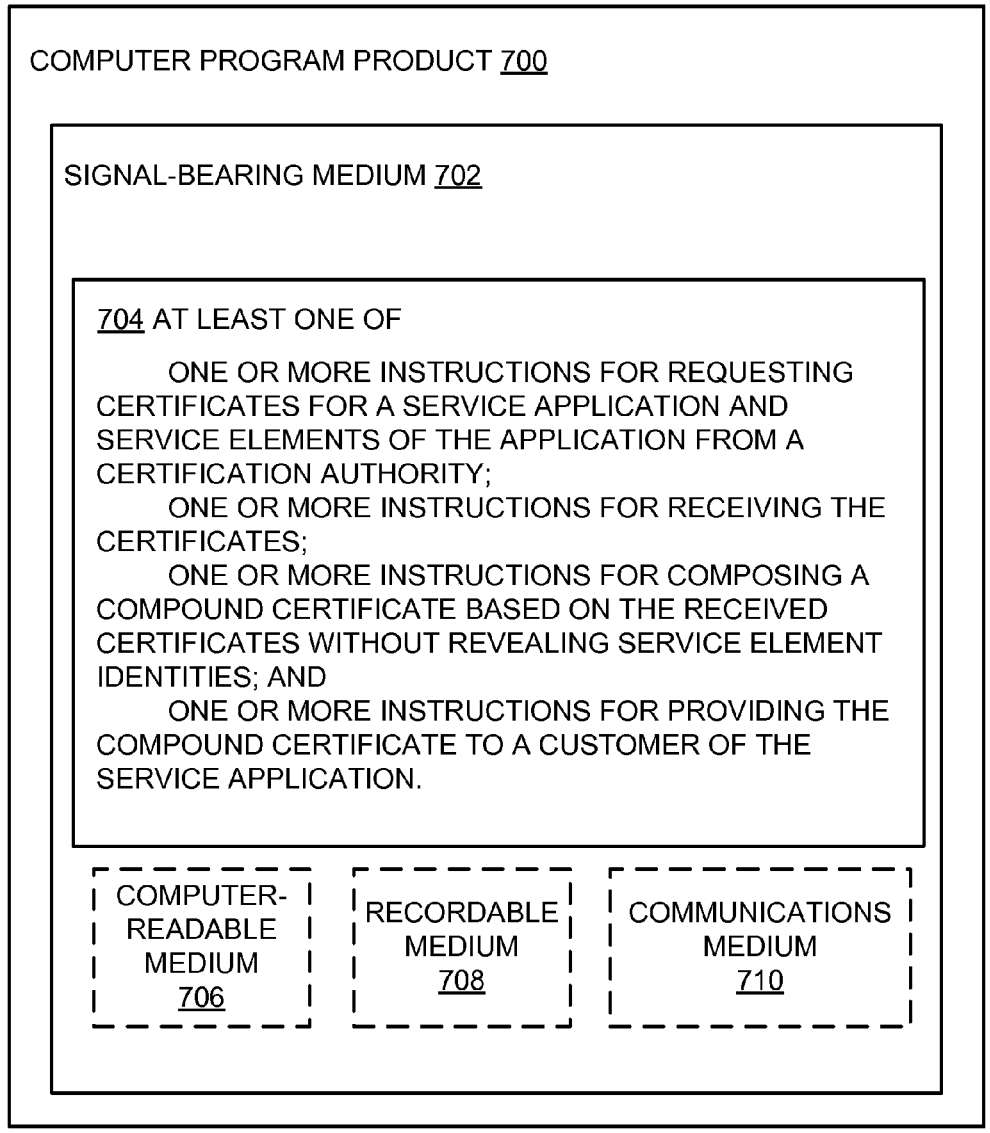
FIG. 7 illustrates a block diagram of an example computer program product; all arranged in accordance with at least some embodiments described herein.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the certification application 522 may undertake one or more of the tasks shown in FIG. 7 in response to the instructions 704 conveyed to the processor 504 by the medium 702 to perform actions associated with managing compound certification for assurance without revealing infrastructure as described herein. Some of those instructions may include, for example, requesting certifications for a service application and service elements of the application from a certification authority, receiving the certificates, composing a compound certificate based on the received certificates without revealing service element identifies, and/or providing the compound certificate to a customer of the service application, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for employing compound certification for assurance may include receiving, at an intermediary certification service, a redirected request for certification from a service application, requesting certificates associated with the service application and service elements of the service application from a certification authority, receiving the certificates, composing a compound certificate based on the received certificates, where the compound certificate suppresses identities of the service elements, and providing the compound certificate in response to the redirected request.

According to some embodiments, the method may further include composing the compound certificate as a logic combination of the received certificates. The received certificates may establish compliance of each service element with predefined rules, standards, and/or practices. The method may further include indicating a lowest common compliance level in the compound certificate if compliance levels of two or more service elements as defined by their respective certificates differ. The certificates may prove compliance with payment card industry (PCI), health insurance portability and accountability act (HIPAA), controlled commerce list (CCL), ISO certifications, or international traffic in arms regulations (ITAR).

According to other embodiments, the method may further include receiving the certificates from multiple certification authorities. The service elements may include a computation service, a storage service, a platform service, and/or an interaction service. The method may further include performing testing and/or certification tasks for at least one of the service elements at the intermediary certification service, enabling the service application to price certified and noncertified services by choosing whether to invoke the intermediary certificate service, and/or enabling the service elements to provide tokens to the service application and receiving the tokens from the service application for delivery to the certification authority.

According to other examples, a method for employing compound certification for assurance may include receiving a request for service from an application hosted by a datacenter, where the request includes a request for certification, separating the request for certification from the request for service, requesting certificates associated with the application and service elements of the application from a certification authority, receiving the certificates, composing a compound certificate based on the received certificates, where the compound certificate suppresses identities of the service elements, and providing the compound certificate in response to the request for service.

According to some embodiments, the method may further include composing the compound certificate as a logic combination of the received certificates; intercepting the request for service that includes the request for certificate; separating the request for certificate; and/or forwarding the request for certificate to an intermediary certification service at one of a gateway or a session border controller of the datacenter hosting the application. The application may have a service-based architecture. The received certificates may establish compliance of each service element with predefined rules, standards, and/or practices. The method may further include indicating a lowest common compliance level in the compound certificate if compliance levels of two or more service elements as defined by their respective certificates differ. The certificates may prove compliance with payment card industry (PCI), health insurance portability and accountability act (HIPAA), controlled commerce list (CCL), ISO certifications, or international traffic in arms regulations (ITAR).

According to other embodiments, the method may further include receiving the certificates from multiple certification authorities. The service elements may include a computation service, a storage service, a platform service, and/or an interaction service. The method may further include enabling the application to price certified and noncertified services by choosing whether to invoke the intermediary certificate service and/or enabling the service elements to provide tokens to the application and receiving the tokens from the application for delivery to the certification authority.

According to further examples, an intermediate certification service configured to employ compound certification for assurance may include communication module(s) configured to communicate with service applications hosted by datacenters and certification authorities and a server. The server may be configured to receive a redirected request for certification from a service application, request certificates associated with the service application and service elements of the service application from a certification authority, receive the certificates, compose a compound certificate based on the received certificates, where the compound certificate suppresses identities of the service elements, and provide the compound certificate in response to the redirected request.

According to some embodiments, the server may be further configured to compose the compound certificate as a logic combination of the received certificates. The received certificates may establish compliance of each service element with predefined rules, standards, and/or practices. The server may be further configured to indicate a lowest common compliance level in the compound certificate if compliance levels of two or more service elements as defined by their respective certificates differ. The certificates may prove compliance with payment card industry (PCI), health insurance portability and accountability act (HIPAA), controlled commerce list (CCL), ISO certifications, or international traffic in arms regulations (ITAR).

According to other embodiments, the server may be further configured to receive the certificates from multiple certification authorities. The service elements may include a computation service, a storage service, a platform service, and/or an interaction service. The intermediary certification service may be further configured to perform testing and/or certification tasks for at least one of the service elements. The server may be further configured to enable the service application to price certified and noncertified services by choosing whether to invoke the intermediary certificate service, and/or enable the service elements to provide tokens to the service application and receiving the tokens from the service application for delivery to the certification authority.

According to yet further examples, a cloud-based datacenter configured to employ compound certification for assurance may include multiple virtual machines operable to be executed on one or more physical machines, where at least one of the virtual machines hosts a service application configured to provide a combination service to customers. The datacenter may also include a datacenter controller configured receive a request for service from the service application hosted by the datacenter, where the request includes a request for certification, separate the request for certification from the request for service, and forward the request for certificate to an intermediary certification service such that a compound certificate composed of individual certificates for sub-services that suppresses identities of service elements is provided by the intermediary certification service in response to the request for service.

According to some embodiments, the intermediary certification service may be further configured to compose the compound certificate as a logic combination of the received certificates. The datacenter controller may be a gateway or a session border controller interfacing with the service application. The intermediary certification service may be provided by the datacenter. The certificates may establish compliance of each service element with one or more of predefined rules, standards, and/or practices. The intermediary certification service may be further configured to indicate a lowest common compliance level in the compound certificate if compliance levels of two or more service elements as defined by their respective certificates differ.

According to other embodiments, the certificates may prove compliance with one or more of payment card industry (PCI), health insurance portability and accountability act (HIPAA), controlled commerce list (CCL), or international traffic in arms regulations (ITAR). The service elements may include one or more of a computation service, a storage service, a platform service, and an interaction service. The intermediary certification service may be further configured to receive the certificates from a plurality of certification authorities. The service application may be enabled to price certified and noncertified services by choosing whether to invoke the compound certificate. The datacenter controller may further be configured to enable the service elements to provide tokens and provide the tokens to the intermediary certification service.

According to some examples, a computer-readable storage medium may store instructions for employing compound certification for assurance. The instructions may include receiving a redirected request for certification at an intermediary certification service from a service application, requesting certificates associated with the service application and service elements of the service application from a certification authority, receiving the certificates, composing a compound certificate based on the received certificates, where the compound certificate suppresses identities of the service elements, and providing the compound certificate in response to the redirected request.

According to some embodiments, the instructions may further include composing the compound certificate as a logic combination of the received certificates. The received certificates may establish compliance of each service element with predefined rules, standards, and/or practices. The instructions may further include indicating a lowest common compliance level in the compound certificate if compliance levels of two or more service elements as defined by their respective certificates differ. The certificates may prove compliance with payment card industry (PCI), health insurance portability and accountability act (HIPAA), controlled commerce list (CCL), ISO certifications, or international traffic in arms regulations (ITAR).

According to other embodiments, the instructions may further include receiving the certificates from multiple certification authorities. The service elements may include a computation service, a storage service, a platform service, and/or an interaction service. The instructions may further include performing testing and/or certification tasks for at least one of the service elements at the intermediary certification service, enabling the service application to price certified and noncertified services by choosing whether to invoke the intermediary certificate service, and/or enabling the service elements to provide tokens to the service application and receiving the tokens from the service application for delivery to the certification authority.

According to other examples, a computer-readable storage medium may store instructions for employing compound certification for assurance. The instructions may include receiving a request for service from an application hosted by a datacenter, where the request includes a request for certification, separating the request for certification from the request for service, requesting certificates associated with the application and service elements of the application from a certification authority, receiving the certificates, composing a compound certificate based on the received certificates, where the compound certificate suppresses identities of the service elements, and providing the compound certificate in response to the request for service.

According to some embodiments, the instructions may further include composing the compound certificate as a logic combination of the received certificates; intercepting the request for service that includes the request for certificate;

separating the request for certificate; and/or forwarding the request for certificate to an intermediary certification service at one of a gateway or a session border controller of the datacenter hosting the application. The application may have a service-based architecture. The received certificates may establish compliance of each service element with predefined rules, standards, and/or practices. The instructions may further include indicating a lowest common compliance level in the compound certificate if compliance levels of two or more service elements as defined by their respective certificates differ. The certificates may prove compliance with payment card industry (PCI), health insurance portability and accountability act (HIPAA), controlled commerce list (CCL), ISO certifications, or international traffic in arms regulations (ITAR).

According to other embodiments, the instructions may further include receiving the certificates from multiple certification authorities. The service elements may include a computation service, a storage service, a platform service, and/or an interaction service. The instructions may further include enabling the application to price certified and noncertified services by choosing whether to invoke the intermediary certificate service and/or enabling the service elements to provide tokens to the application and receiving the tokens from the application for delivery to the certification authority.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to employ compound certification for assurance, the method comprising:
    receiving, at an intermediary certification service executed by one or more computing devices, a redirected request for certification from a service application;
    requesting certificates associated with the service application and service elements of the service application from a certification authority executed by one or more other computing devices;
    receiving the certificates;
    composing a compound certificate based on a logic combination of certified properties associated with each of the service elements from the received certificates, wherein the compound certificate suppresses identities of the service elements and indicates a lowest common compliance level in the compound certificate in response to a determination that compliance levels of two or more service elements as defined by their respective certificates differ; and
    providing the compound certificate in response to the redirected request.

2. The method according to claim 1, wherein the received certificates establish compliance of each service element with one or more of predefined rules, standards, and/or practices.

3. The method according to claim 2, wherein the certificates prove compliance with one or more of payment card industry (PCI), health insurance portability and accountability act (HIPAA), controlled commerce list (CCL), ISO certifications, or international traffic in arms regulations (ITAR).

4. The method according to claim 1, further comprising receiving the certificates from a plurality of certification authorities.

5. The method according to claim 1, wherein the service elements include one or more of a computation service, a storage service, a platform service, and an interaction service.

6. The method according to claim 1, further comprising performing one or more of testing and certification tasks for at least one of the service elements at the intermediary certification service.

7. The method according to claim 1, further comprising enabling the service application to price certified and noncertified services by choosing whether to invoke the intermediary certification service.

8. A method to employ compound certification for assurance, the method comprising:
- receiving a request for service from an application hosted by at least one virtual machine operable to be executed on one or more physical machines of a datacenter, wherein the request includes a request for certification;
- separating the request for certification from the request for service;
- requesting certificates associated with the application and service elements of the application from a certification authority executed by one or more computing devices at another datacenter;
- receiving the certificates;
- composing a compound certificate based on a logic combination of certified properties associated with each of the service elements from the received certificates, wherein the compound certificate suppresses identities of the service elements and indicates a lowest common compliance level in the compound certificate in response to a determination that compliance levels of two or more service elements as defined by their respective certificates differ; and
- providing the compound certificate in response to the request for service.

9. The method according to claim 8, further comprising:
- intercepting the request for service that includes the request for certificate;
- separating the request for certificate; and
- forwarding the request for certificate to an intermediary certification service at one of a gateway or a session border controller of the datacenter hosting the application.

10. The method according to claim 8, wherein the application has a service-based architecture.

11. The method according to claim 8, wherein the service elements include one or more of a computation service, a storage service, a platform service, and an interaction service.

12. The method according to claim 8, further comprising enabling the application to price certified and noncertified services by choosing whether to invoke the compound certificate.

13. The method according to claim 8, further comprising:
- enabling the service elements to provide tokens to the application; and
- receiving the tokens from the application for delivery to the certification authority.

14. A cloud-based datacenter configured to employ compound certification for assurance, the datacenter comprising:
- a plurality of virtual machines operable to be executed on one or more physical machines, wherein at least one of the virtual machines hosts a service application configured to provide a combination service to customers; and
- a datacenter controller configured to:
  - receive a request for service from the service application hosted by the datacenter, wherein the request includes a request for certification;
  - separate the request for certification from the request for service; and
  - forward the request for certificate to an intermediary certification service such that a compound certificate composed of a logic combination of certified properties associated with service elements from individual certificates for sub-services that suppresses identities of the service elements and indicates a lowest common compliance level in the compound certificate in response to a determination that compliance levels of two or more of the service elements as defined by their respective certificates differ is provided by the intermediary certification service in response to the request for service.

15. The datacenter according to claim 14, wherein the datacenter controller is one of a gateway or a session border controller interfacing with the service application.

16. The datacenter according to claim 14, wherein the intermediary certification service is provided by the datacenter.

17. The datacenter according to claim 14, wherein the certificates establish compliance of each service element with one or more of predefined rules, standards, and/or practices.

18. The datacenter according to claim 14, wherein the service elements include one or more of a computation service, a storage service, a platform service, and an interaction service.

19. The datacenter according to claim 14, wherein the intermediary certification service is further configured to receive the certificates from a plurality of certification authorities.

20. The datacenter according to claim 14, wherein the service application is enabled to price certified and noncertified services by choosing whether to invoke the compound certificate.

21. The datacenter according to claim 14, wherein the datacenter controller is further configured to:
- enable the service elements to provide tokens; and
- provide the tokens to the intermediary certification service.

* * * * *